United States Patent [19]

Rathsack et al.

[11] 4,209,910
[45] Jul. 1, 1980

[54] AUXILIARY DEVICE FOR VERTICAL TURNING AND BORING MACHINE TOOLS

[75] Inventors: Gunther Rathsack; Reinhard Hendel, both of Hamburg, Fed. Rep. of Germany

[73] Assignee: Gunther Rathsack Ingenieurtechnik, Hamburg, Fed. Rep. of Germany

[21] Appl. No.: 905,467

[22] Filed: May 12, 1978

[51] Int. Cl.² ............................................. B27G 23/00
[52] U.S. Cl. ............................. 33/185 R; 33/174 TD; 82/2 D; 408/237; 269/55; 269/57; 409/220; 414/589
[58] Field of Search ................... 82/2 D; 408/20, 23, 408/237; 29/33, 568; 269/57, 55; 414/589, 744 R; 33/185 R, 174 TD, 174 TA; 409/220

[56] References Cited

U.S. PATENT DOCUMENTS

| Re. 26770 | 1/1970 | Lemelson | 29/33 |
| 3,741,674 | 6/1973 | Witzig et al. | 408/237 |
| 3,825,245 | 7/1974 | Osburn et al. | 269/57 X |
| 3,831,283 | 8/1974 | Pagella et al. | 33/174 TA X |
| 3,986,617 | 10/1976 | Blomquist | 269/57 X |
| 4,164,076 | 8/1979 | Carrigan | 33/185 R |

FOREIGN PATENT DOCUMENTS

| 2312786 | 3/1973 | Fed. Rep. of Germany | 82/2 D |
| 2320918 | 4/1973 | Fed. Rep. of Germany | 82/2 D |
| 7110364 | 4/1974 | Fed. Rep. of Germany | |
| 2542517 | 9/1975 | Fed. Rep. of Germany | |
| 1263912 | 2/1972 | United Kingdom | 29/568 |

*Primary Examiner*—Leonidas Vlachos
*Attorney, Agent, or Firm*—Fleit & Jacobson

[57] ABSTRACT

An auxiliary device for use with vertical turning and boring machine tools having rotary work surfaces. The auxiliary device has a generally circular-shaped pallet and a support or mounting frame for supporting the pallet. The pallet has a hub for centering the pallet on a rotary work surface of a machine tool or for centering the pallet on the mounting frame. The pallet is fixed in such manner to the mounting frame that it can rotate with respect to the mounting frame and is fixed to the machine tool in such manner that it rotates with the rotary work surface. The pallet includes a plurality of radially extending openings which are engageable by clamping devices to position one or more workpieces in a desired position on the pallet. The mounting block has a central portion for supporting the hub of the pallet and radially extending arms having rollers engageable with a circular track positioned on the bottom surface of the pallet. One of the rollers is driven to rotate the pallet. A vertical column is spaced radially outwardly from a pallet positioned on the mounting frame and carries a horizontal arm. A mount for measuring devices and auxiliary adjusting devices is adjustably mounted on the horizontal arm in such manner that the carried devices can move in three independent directions in space.

13 Claims, 9 Drawing Figures

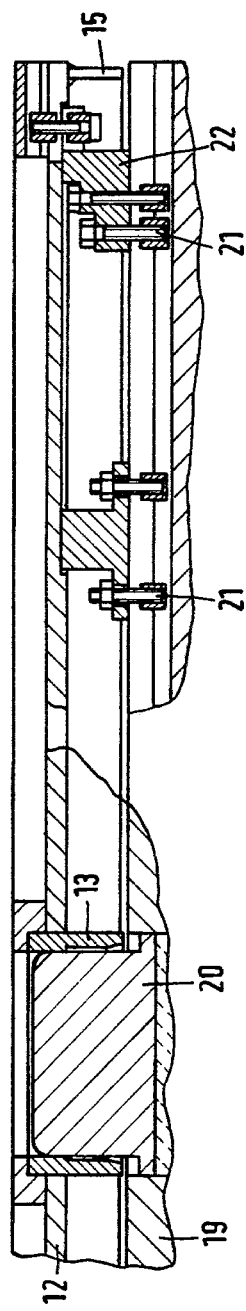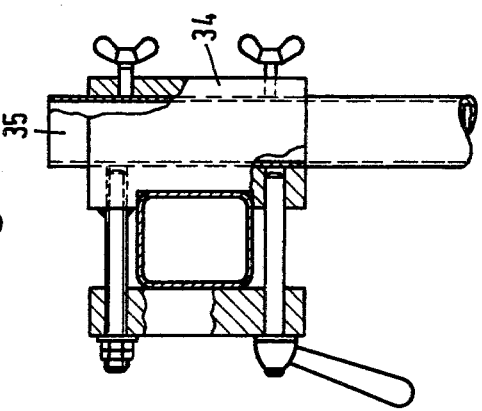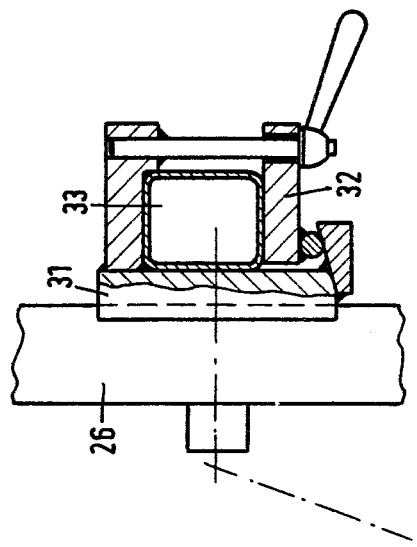

AUXILIARY DEVICE FOR VERTICAL TURNING AND BORING MACHINE TOOLS

BACKGROUND OF THE INVENTION

1. Field of the Invention

This invention relates to vertical turning and boring machine tools and, more particularly, to an auxiliary device for improving the output of such tools.

2. Description of the Prior Art

All workpieces that are to be machined on vertical turning and boring machine tools must be aligned on the work or rotary table of the machine tool. This alignment requires a great deal of time, especially with large and heavy workpieces, and work or rotary tables with diameters more than 2500 mm. During this alignment period, the machine tool performs no work, so that the economic efficiency of such machine tools is very small.

SUMMARY OF THE INVENTION

It is an object of the present invention to shorten the idle and rest time of such vertical turning and boring machine tools.

The present invention utilizes an auxiliary device having a pallet fitting the dimensions of the machine tool's rotary table. The pallet has a hub part which can be centered on a central pivot of the rotary table to mount the pallet on the table and includes connecting devices for connecting the pallet and rotary table. The pallet also has provisions for holding workpieces in desired positions on the pallet. The auxiliary device includes a support or mounting frame having a turnable pivot for receiving a hub opening of the pallet.

With the present invention, workpieces themselves need no longer be aligned on the vertical turning and boring machine tool because the alignment procedure is undertaken with the auxiliary device. After the alignment of the workpiece or workpieces on the pallet of the auxiliary device, the pallet and aligned workpiece are placed on the rotary mounting table of the lathe or other machine tool and immediately fixed in a desired orientation by a central pivot. According to the forces occurring during the machining, the pallet of the auxiliary device can be further secured with clamping devices to the rotary table of the machine tool.

As soon as the pallet is positioned, the actual work procedure of the machine tool can begin immediately. During the operating time of the machine tool, the possibility exists of mounting and aligning the next workpiece or workpieces on a second pallet. The pallets with the workpieces need merely be exchanged, so that a practically continuous operation of the machine tool occurs. The exchange of the pallets is performed with a crane implement or a running gear with its own drive.

The auxiliary device includes a mounting frame having rollers for supporting the lower side of the pallet. The lower side of the pallet includes ribs defining a circular path for the rollers. According to a further feature of the invention, one of the rollers is driven by a motor to rotate the pallet.

According to another feature of the invention, a vertical column for an extension arm is positioned on the mounting frame outside of the area of the pallet. The arm is adjustable heightwise, radially, and axially and extends parallel to the pallet surface.

Aside from the preparation of workpieces for machining on a vertical turning and boring machine tool, the auxiliary device can also be used itself as a light machine tool by mounting tools suitable for drilling, milling, grinding, etc., on the adjustable extension arm connected with the column.

Further particulars and features of the invention arise from the following detailed description and the attached drawings, in which a preferred method of operation of auxiliary devices according to the invention are depicted by way of illustration.

BRIEF DESCRIPTION OF THE DRAWING

In the detailed description of the preferred embodiments of the invention presented below, reference is made to the accompanying drawing, in which:

FIG. 3 is a partial cross section through one embodiment of a pallet according to the present invention, positioned on a rotary table of a machine tool;

FIG. 4 is a partially broken away, cross section taken along section line IV—IV of FIG. 1;

FIG. 5 is a partially broken away, cross section taken along section line V—V of FIG. 1;

DESCRIPTION OF THE PREFERRED EMBODIMENTS

Figure 1:
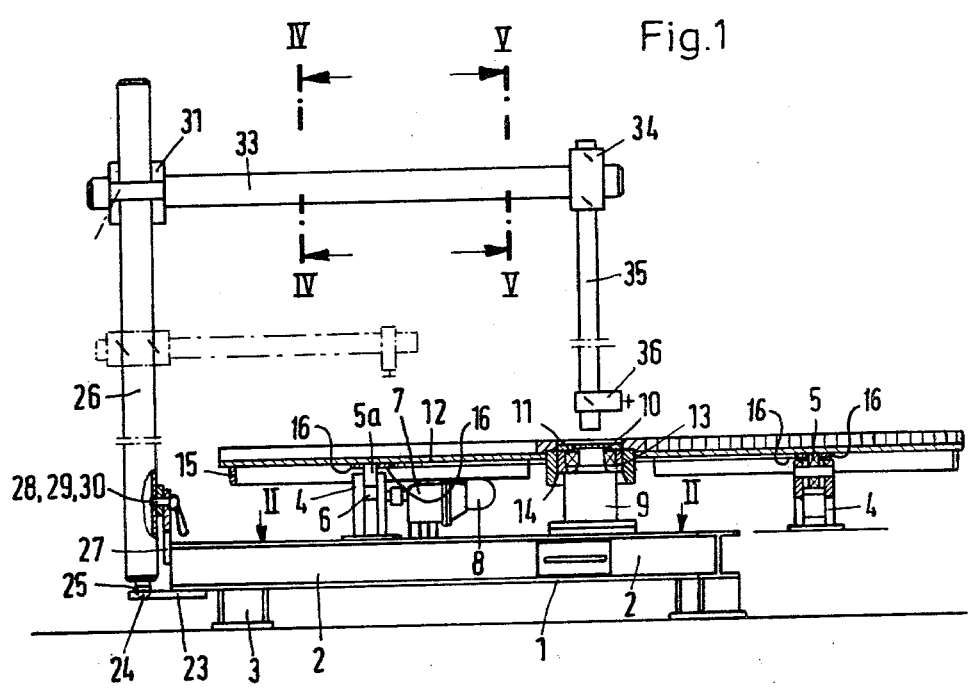
FIG. 1 illustrates a vertical, diametrical section through one embodiment of an auxiliary device according to the present invention.
Figure 2:
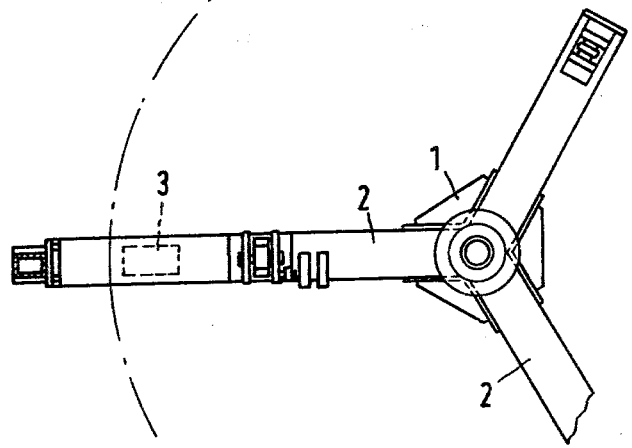
FIG. 2 is a partial sectional view taken along line II—II of FIG. 1.

Because vertical turning and boring machine tools are well known, the present description will be directed in particular to elements forming part of, or cooperating more directly with, the present invention. Elements not specifically shown or described herein are understood to be selectable from those known in the art.

Referring now to the drawings, with specific reference to FIGS. 1-6, an auxiliary device according to the present invention is illustrated. The auxiliary device has a mounting frame 1 with three radially directed arms 2, which, with the help of feet 3, support the device on the floor of a factory.

A pillow block 4 for rollers 5 is positioned on each of the three frame arms 2. These rollers 5 are arranged in circumferential direction. One of the bearing rollers, i.e., the bearing roller designated 5a in FIG. 1, is supported by a pair of supporting rollers 6 and driven by frictional contact with the rollers. One of the supporting rollers 6 is driven by an axle connected with a transmission 7 driven by an electric motor 8.

The center of the mounting frame 1 carries a central axle 9 which carries a pivot 10 supported by a roller bearing 11.

The hub 13 of a disc-shaped pallet 12 is placed on the pivot 10. The upper side of the pallet 12 corresponds to the customary arrangement of a rotary table of vertical turning and boring machine tools. The pallet 12 is mounted from above on mounting frame 1 with its hub 13 on the pivot 10 and its lower side supported on the rollers 5. In order to facilitate centered mounting on the pivot, a bevel 14 is provided on lower inner side of hub 13. Preferably, when the pallet 12 is manufactured by welded construction, a stiffening ring 15 is welded onto the lower side of the palette 12. This stiffening ring 15 can be placed according to the size of the palette inside or outside of a ring-shaped guideway 16 provided for the rollers 5.

Figure 6:
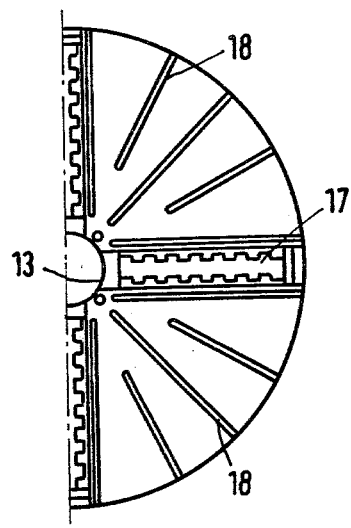
FIG. 6 is a partial top view of one embodiment of a pallet according to the present invention.

As illustrated in FIG. 6, the top surface of the pallet has strengthening recesses 17 positioned in radial alignment and radial t-shaped slots 18 into which lock screws with hammer-shaped heads can be inserted. Thus, the top surface is similar to that of rotary tables customarily used with vertical turning and boring lathes and similar machines.

As illustrated in FIG. 3, the pallet 12 with its hub 13 can be mounted on a central pivot 20 of a rotary table 19 of a vertical turning and boring machine tool. The pivot 20 is provided for or mounted on the table 19 for this purpose. After hub 13 is positioned on pivot 20, pallet 12 is connected for rotation with table 19 in any conventional manner. For instance, screw bolts 21 with hammer-shaped heads are interconnected between the pallet 12 and the machine tool's rotary table 19. When mounting, spacing pieces 22 can also be interposed in a customary fashion. Preferably, in order to facilitate mounting the pallet 12 on the rotary table 19 of the machine tool, the stiffening ring 15 is interrupted so that one can reach into the space between rotary table 19 and pallet 12 with a wrench or other suitable tool.

In order to center or position a workpiece on the exchangeable pallet 12, a butt strap 23 is welded onto an arm 2 of the mounting frame outside of the pallet area. The butt strap 23 has a suitably shaped opening, for instance conical central borehole 24, for receiving a mating member, for instance conical pivot 25, of a tube-shaped column 26. The column 26 is connected with the mounting frame 1 in an easily disconnectable way and bears for this purpose a radially directed screw bolt which can engage in a borehole 28 of another butt strap 27 connected to the mounting frame. A nut 30, provided with a hand lever, provides the possibility of tightening the column 26 tightly in place. The column 26 extends axially parallel to the central axle or axis 9 of the auxiliary device.

A tube-shaped sliding guide 31, as illustrated in FIG. 4, is mounted on the column 26. Another tube-shaped sliding guide 32 for an extension arm 33 is attached to guide 31. With the help of the tube-shaped sliding guides 31, 32, the extension arm 33 can be adjusted in terms of height, shifted axially, and also tilted in a circumferential direction. At the free end of the extension arm 33, a further double sliding guide 34 is located which provides the possibility of bringing a tube-shaped carrier 35 for tools or sensing devices into a desired setting vis-a-vis the surface of the pallet 2. An axially sliding clamping device is located on the lower end of the tool carrier 35. Tools or sensing devices can be attached to carrier 35 with clamping screws. The tools can include scribers, dial guages, etc., which can be brought close to the mounted workpiece in both an axial and a radial direction. Thus, the position of the workpiece can be detected through slow turning of the pallet 12—for instance, with two rotations per minute—in order to carry out an adjustment with the support devices in the recesses 17 and 18.

As illustrated in FIGS. 4 and 5, the tube-shaped elements 26, 33, and 35 have a right-angle cross section, so that reciprocal 90° alignment is assured. With a suitable arrangement of the column 26, the extension arm approaches the pallet 12 always radially off center. In case it is desired to make the extension arm 33 also tiltable, a circular tube section will be chosen for the column 26.

Clamping jaws with clamp bolts and with nuts equipped with hand levers serve to install and secure the tube-shaped sliding guides 31, 32, and 34.

When desired, a further extension arm is attached to the column 26, parallel to the extension arm 33, as illustrated by dotted lines in FIG. 1. Such an auxiliary extension arm can, on occasion, also bear a lighting attachment.

With several minor changes, the auxiliary device according to the invention can also be applied to other operations. If, for example, the geared motor 7, 8 is replaced with a stepping motor with brakes, spacing, by angular degrees, on large workpieces is achieved. Instead of or in addition to using the mount 36 for a scriber or dial guage, the mount can also be used as a tool carrier for compressed air or electrical tools. Such tools are used for drilling, grinding, deburring, or polishing operations. In this manner, large vertical turning and boring machine tools can be further relieved of load with reference to their costly hours of operation.

Figure 7:
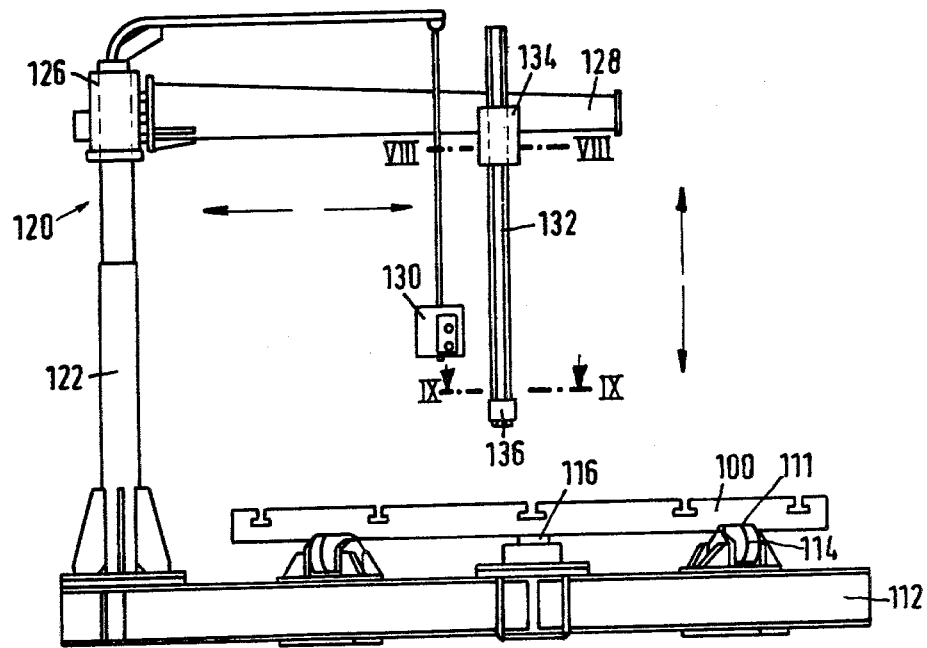
FIG. 7 is a side view of one embodiment of a device according to the present invention including a mechanism for at least partially power-operated setting of a mount for a tool or measuring device.
Figure 8:
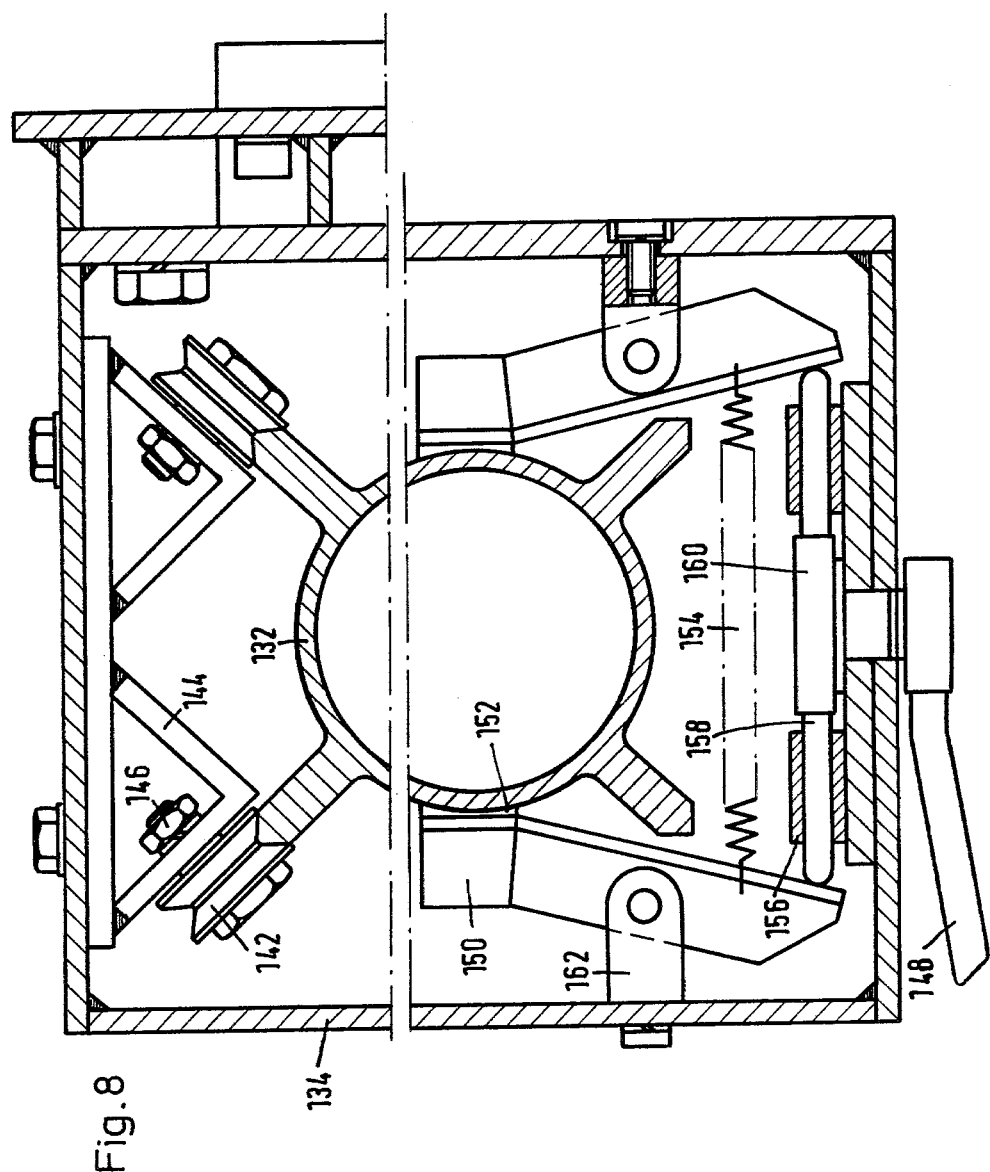
FIG. 8 is a cross-sectional view taken partially along section line VIII—VIII of FIG. 7 and partially along a section plane positioned above section line VIII—VIII.
Figure 9:
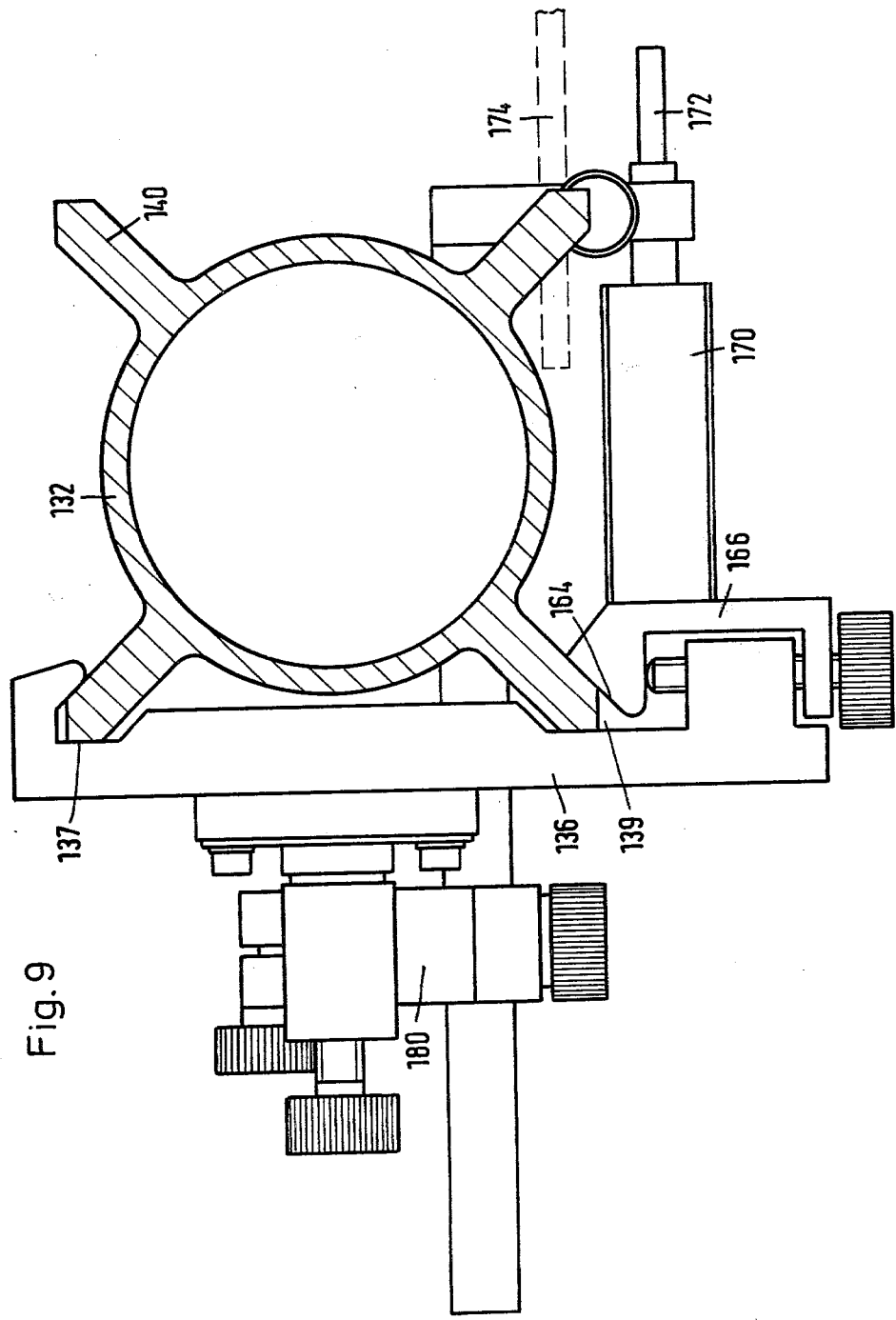
FIG. 9 is a view taken generally along section line IX—IX of FIG. 7.

Referring now to FIGS. 7-9, and to FIG. 7 in particular, a modified embodiment of the invention is illustrated. A pallet 100 is supported by a pivot 116 of a mounting frame 112 in such a way that, after alignment and clamping of a workpiece or workpieces on the pallet, the pallet can be removed from the mounting frame 112 and placed on a work table of a vertical turning and boring machine tool. The pallet 100 is equipped with devices for secure connection of the pallet 100 to the work table of the machine tool. In addition, the pallet 100 has grooves or the like on its upper side which serve to attach a workpiece in a desired position on the upper side. A circular track ring 111 is located on a lower side of the pallet 100. The pallet 100 rests on the mounting frame with the track ring in contact with rollers 114 which are arranged on the mounting frame. One of the rollers is driven to turn the pallet 100 around the axis of the pivot. It will be readily appreciated that these elements are similar to those already described in connection with the embodiment illustrated in FIGS. 1-6.

Referring again to FIG. 7, an adjustable mount generally designated 120, for tools, measuring devices, or the like is set on the mounting frame 112. The mount 120 includes a vertical column 122 which carries on its upper end a cantilever 128 tiltable by means of a turning attachment 126. A horizontally and vertically movable carrier tube 132 is positioned on the arm 128 by means of a mount 134. A switching device 130, which contains a push-button control, controls tilting of the arm 128. The switching device is connected by a linkage containing circuit connections with a motor contained in the attachment 126. A tow-line (not shown) is provided to move the mount 134 along the cantilever 128. Preferably, the tow-line is operated by the switching device 130.

A carrier tube 132 (see FIG. 8) is guided in the mount 134 by means of rollers 142. For this purpose, ribs are arranged all around the tube, preferably at identical angular distances. The outer edges of the ribs 140 extend in a longitudinal direction parallel with the axis of the tube 132 and run in the rollers 142. Preferably, the rollers 142 have a suitable incised angle section for guiding the ribs 140. Each roller 142 is individually adjustable. For this purpose, the rollers 142 are mounted on pivots which are attached in mounts 144 by means of eccentrics—for example, with screw nuts 146. Adjustment of an eccentric also adjusts the accompanying roller 142.

As illustrated in FIG. 8, clamping jaws 150, operable by means of a lever 148, are provided to assure the vertical adjustment of the tube 132 in the mount. The clamping jaws 150 carry on their inner sides a friction lining 152. The lever-shaped jaws 150 are mounted in supports 162 and pre-stressed to the release position by a spring 154. An eccentric 160 is operated by the lever 148 which, with the chucking of the jaws, moves apart tappets 158 which are held displaced in guideways 156. When the lever 148 is shifted to the release position, the spring 154 pulls the jaws 150 apart and simultaneously assures that the tappets 158 remain engaged with the eccentric 160.

As illustrated in FIG. 9, tube 132 carries on its lower end a mount 136 for tools, measuring devices, or the like. The ribs arranged on the tube 132 permit the mount 136 to be attached at four different angular positions. In addition, the ribs 140 make possible the simultaneous attachment of more than one mount. Each rib 140 is three-edged on its outer side in such a way that on each side two surfaces that form the outer side of rib 140 run into each other. The device 136 is therefore formed of two suitably shaped grooves 137, 139 which cover two neighboring ribs 140. Each groove 137 and 139, respectively, engages with two edge surfaces of the rib 140. The engaged surfaces are divided by a third surface that generally remains out of contact with the border surfaces of the grooves. In order to make clamping possible, one of the grooves, for instance groove 139, is formed with a wall 164 movable by means of a screw device 166.

Types of mechanisms attached to mount 136 include a scriber 174 and a measuring element 172 with a dial gauge. Preferably, an adjusting device 180 is also positioned with the mechanisms on mount 136.

The invention has been described in detail with particular reference to preferred embodiments thereof, but it will be understood that variations and modifications can be effected within the spirit and scope of the invention.

We claim:

1. An auxiliary device for use with vertical turning and boring machine tools having rotary work surfaces comprising:
   (a) a generally circular-shape pallet having:
       (1) centering means for centering the pallet on a rotary work surface of a vertical turning and boring machine tool, and
       (2) means for securing a workpiece in a desired position on the pallet; and
   (b) support means for supporting said pallet comprising:
       (1) a frame,
       (2) pillow block support means carried by said frame and cooperating with said centering means for supporting said pallet for rotation with respect to said frame, and
       (3) means for adjustably mounting carrying devices for measuring devices and auxiliary adjusting devices.

2. An auxiliary device according to claim 1, wherein said pallet includes means for defining a circular track on a lower surface of said pallet and wherein said support means includes a bearing trestle having rollers engageable with said circular track to support said pallet from below.

3. An auxiliary device according to claim 2 or 1, wherein said centering means includes a hub-hole for centering the pallet, the hub-hole being conically widened at its lower end.

4. An auxiliary device according to claim 2 or 1, wherein said means for securing a workpiece includes a radially-extending, T-shaped slot positioned in an upper surface of the pallet, the slot being adapted to receive a clamping device for clamping a workpiece to the pallet.

5. An auxiliary device according to claim 2 wherein said means for adjustably mounting carrying devices comprises a vertical column spaced radially outwardly from a pallet positioned on said support means, an extension arm carried by said column, and a mount positioned on said extension arm and having changeable connecting elements for adjusting the mount in three independent directions in space.

6. An auxiliary device according to claim 1, wherein said pallet includes means for defining a circular track on a lower surface of said pallet and wherein said support means includes:
   a bearing trestle having rollers engageable with said circular track to support said pallet from below; and
   means for driving one of said rollers.

7. An auxiliary device according to claim 1 wherein said pallet includes means for defining a circular track on a lower surface of said pallet and wherein said support means includes:
   a bearing trestle having rollers engageable with said circular track to support said pallet from below; and
   means for driving one of said rollers having a pair of counteracting rollers for supporting the roller being driven and an electric motor for driving one of said pair of counteracting rollers.

8. An auxiliary device according to claim 1 wherein said means for adjustably mounting carrying devices comprising at least one vertical column, a horizontal arm carried by said column, and a horizontally and vertically adjustable mount positioned on the arm, said column being radially outwardly spaced from a pallet positioned on said support means.

9. An auxiliary device according to claim 8 further comprising two guiding sockets having clamping devices for connecting said arm to said column and one guiding socket having a clamping device for connecting said mount to said arm.

10. An auxiliary device according to claims 8 or 5 wherein said support means includes a guiding piece and wherein said vertical column is releasably anchored in said guiding piece.

11. An auxiliary device according to claim 10 wherein said mount comprises a holding device mounted for horizontal movement on said arm and a longitudinally-extending tube vertically movable in said holding device, said tube having longitudinally-extending axial projections, said holding device having at least one roller engageable with one of said projections for guiding vertical movement of said tube and clamp means for locking said tube in a desired position.

12. An auxiliary device according to claim 11 wherein said tube has four equally angularly spaced axial projections.

13. An auxiliary device according to claim 12 wherein said holding device includes two rollers having guide surfaces defined on their peripheries and wherein said projections include portions engageable with said guide surfaces.

* * * * *